US008488327B2

(12) United States Patent
Garnier (10) Patent No.: US 8,488,327 B2
(45) Date of Patent: Jul. 16, 2013

(54) FOLDABLE USB AND ISO 7816 DEVICE

(75) Inventor: Laurent Garnier, Moulins (FR)

(73) Assignee: Oberthur Technologies, Levallois Perret (FR)

( * ) Notice: Subject to any disclaimer, the term of this patent is extended or adjusted under 35 U.S.C. 154(b) by 588 days.

(21) Appl. No.: 12/553,000

(22) Filed: Sep. 2, 2009

(65) Prior Publication Data

US 2010/0142161 A1    Jun. 10, 2010

(30) Foreign Application Priority Data

Sep. 15, 2008 (FR) ...................................... 08 05044

(51) Int. Cl.
 *H05K 1/14* (2006.01)
(52) U.S. Cl.
 USPC .......................................................... 361/736
(58) Field of Classification Search
 USPC .......................................................... 361/736
 See application file for complete search history.

(56) References Cited

U.S. PATENT DOCUMENTS

| | | | | | |
|---|---|---|---|---|---|
| 5,004,899 | A | * | 4/1991 | Ueda | 235/492 |
| 5,700,037 | A | * | 12/1997 | Keller | 283/107 |
| 5,710,421 | A | * | 1/1998 | Kokubu | 235/492 |
| 5,936,227 | A | * | 8/1999 | Truggelmann et al. | 235/492 |
| 6,883,718 | B1 | * | 4/2005 | Le et al. | 235/492 |
| 7,156,301 | B1 | * | 1/2007 | Bonalle et al. | 235/380 |
| 7,218,528 | B2 | * | 5/2007 | Chen | 361/737 |
| 7,344,072 | B2 | * | 3/2008 | Gonzalez et al. | 235/441 |
| 7,377,448 | B2 | * | 5/2008 | Dan et al. | 235/492 |
| 7,381,076 | B2 | * | 6/2008 | Bychkov et al. | 439/344 |
| 7,837,122 | B2 | * | 11/2010 | Martinent et al. | 235/492 |
| 8,047,443 | B2 | * | 11/2011 | DePaula | 235/492 |
| 8,061,623 | B2 | * | 11/2011 | Balchaytis | 235/492 |
| 2005/0230483 | A1 | * | 10/2005 | Miller et al. | 235/492 |
| 2005/0230484 | A1 | * | 10/2005 | Cuellar et al. | 235/492 |
| 2006/0206910 | A1 | * | 9/2006 | Kozenitzky et al. | 720/718 |
| 2006/0278723 | A1 | * | 12/2006 | Dan et al. | 235/492 |
| 2009/0089858 | A1 | | 4/2009 | Garnier | |

FOREIGN PATENT DOCUMENTS

GB 2427047 A * 12/2006
WO WO 2012026871 A1 * 3/2012

* cited by examiner

*Primary Examiner* — Timothy Thompson
*Assistant Examiner* — Nathan Milakovich
(74) *Attorney, Agent, or Firm* — LaRiviere, Grubman & Payne, LLP (57) ABSTRACT

A portable electronic device with a USB connector comprising a card body complying with chip card layout standards, with at least one elastic hinge going from one edge to another of the card body allowing a 180° folding, and a contour of the card body such that, in the closed folded state, a zone supporting a USB contact has the thickness and width of a standard male USB connector. Preferably the card body is an ISO 7816 standard card body, incorporating a corresponding connection contact, and it comprises two elastic hinges dividing the card body into a central portion and two lateral portions. The hinges may advantageously be positioned so as to incorporate an antenna and/or a magnetic strip.

13 Claims, 4 Drawing Sheets

FOLDABLE USB AND ISO 7816 DEVICE

PRIORITY CLAIM

This application claims priority to French Patent Application Number 08 05044, entitled Portable Electronic Device with USB Connector, filed on Sep. 15, 2008.

FIELD OF THE INVENTION

The present invention relates to a portable electronic device with a USB connector.

PRIOR ART

Electronic keys with a USB connector have experienced considerable growth and are used as peripheral, removable devices in many electronic devices, in particular as memories and also as logical security devices. Specifically USB connectors are currently found as standard on many items of electronic equipment, and in particular on personal computers, unlike card readers in ISO 7816 (rev. 1987 et seq.) format which are not systematically incorporated into this type of equipment because they are costly.

These keys may have different forms. They must all satisfy the mechanical and electrical specifications described in the standard defining the USB interface. Notably these keys comprise a male connection zone which supports a contact layout, formed of several electrical contact pads. The number, position and dimensions of these pads are standardized, and the width and thickness of this connection zone which must correspond to the space available on insertion into a peripheral USB female connector, so as to ensure a good electrical contact of the contact pads with the counter-contacts of the female connector. In particular, the standard thickness of a USB male connector is of the order 2 millimetres.

It is known practice to produce USB electronic keys using low-cost technologies developed to mass produce electronic smart cards, also called chip cards. This manufacturing method also provides the advantage of being able to benefit from a larger graphic customization surface, leaving more space for publicity. However, the dimensions of smart cards do not correspond to the dimensions of USB connectors. Smart cards are thin, with a standard thickness of 0.76 millimetres, defined by the ISO 7816 standard, while the standard thickness of a USB key is of the order of 2 millimetres. Cutting such a thickness of the card, in order to detach the keys produced continuously on a plate is more difficult. Also the graphic, electric, machining or other customization tools used in the smart card production lines are not suitable for processing thicker cards.

To solve this technical problem, it is known practice to produce a USB key from a smart card of standard thickness, by providing means for local adaptation of the thickness, such as wedges or equivalent mechanical elements, as described for example in application FR 2 830 107.

To allow the production of a USB key from a thin card, in a single piece, without requiring additional mechanical elements, application EP 1755072 proposes to use the flexibility of a plastic card to create a resilient force inherent in the card material which is capable of ensuring a good electrical contact in the female USB connector by pushing the card against the electric contacts in the female connector.

In a first embodiment of which several variants are illustrated in FIGS. 1A, 2A, 3, 4A and 5A of application EP 1755072, it is a question of making it possible to separate the shape of the male connector in a plastic card the thickness of which is not greater than 0.9 mm and preferably less than 0.5 mm ([0028] and notably line 5, column 5 of the published application), while creating a return element which makes it possible to ensure good electrical contact inside the female contact despite the thinness of the male connector thus produced. This is obtained by a combination of two cuts in the whole thickness of the card and at least one fold line. The cuts and the fold together make it possible to separate the shape of the male connector, the fold also making it possible to create the desired resilient force, inside the female connector. In a more detailed manner, the contact pads 16 of the male connector are placed on the surface of the thin card, at a distance from a card edge. Two parallel cuts 24 and 26 are arranged in the card, in the whole thickness of the card body and over 50 to 90% of its length, starting from the edge of the card. These cuts 24 and 26 make it possible to separate the lateral edges of the male USB connector. A fold line is made along the transverse edge of the connector, which makes it possible both to bend under the card, a zone 28 delimited by the edge of the card, the two cut lines and the fold line, thereby separating the transverse edge of the connector. The connector thus separated may be inserted into the female connector while keeping the bent zone 28 under the card: this bent zone 28 then creates the resilient force necessary inside the female connector in order to ensure the good electrical contact, by pushing the card towards the electric contacts of the female connector.

That embodiment therefore compensates for the thinness of the connection element inserted into the female USB connector, by the creation of a return element which makes it possible to use the resilient force inherent in the card material to ensure the good electrical contact. That embodiment assumes it is possible to easily keep this zone 28 in the bent position beneath the connector at the time of insertion. In addition, the return element thus created risks also having the force which tends to maintain the good electrical contact, a force tending to eject the connector.

Another embodiment is shown with reference to FIGS. 6A and 6B, 7A, 7B of application EP 1755072, which assumes the use of a very thin card body, with a thickness of less than 0.2 mm ([0046] of the published application). In that embodiment, the connector is placed on the edge of the card, its shape being separated by fold lines, including two lines along the lateral edges. According to the variant, there are three parallel fold lines, each over the whole length of the card (FIG. 6A), or fold lines and secondary cuts in various directions (FIG. 7A). The zones bent under the card create the resilient force necessary to ensure the good electrical contact inside the female connector. Because of the differences in thickness that pertain, the problem of the ejection force may still arise.

A final embodiment illustrated in FIG. 8A of application EP 1755072 uses a resilient force created from the outside of the female connector. In that embodiment, the male USB connector is separated by the cut lines 24 and 26 and inserted into the female connector. The remaining card portion comes under the female connector. That embodiment seems difficult to use because it is necessary to be able to ensure a sufficient distance between the separated male connector and the card in order to allow both the insertion into the female connector and the sliding of the card beneath the female connector.

The fold, bend or curve lines used to separate the connector from the rest of the card and to form the return element are preformed in the card by making slots in the thickness of the card along these lines, or by locally reducing the thickness of the card ("hinge"). Because of the thicknesses in question, less than 0.5 mm and even 0.2 mm for the embodiment of FIG. 6A of application EP 1755072, the folds and deformations repeated on each handling operation in order to connect and disconnect the connector weaken the card body.

Furthermore, there is a certain advantage in proposing, on a chip card, having both interfaces: one interface complying with the ISO 7816 standard, and one USB interface, whether it be for physical and logical access control or for bank applications. Specifically, it is noted that the cards in the ISO 7816 format are widely used as means for access control to buildings, like electronic badges, with or without contact. These cards notably offer a large enough surface to allow the printing of a photograph of its owner with good quality.

One object of the invention is to propose a USB electronic key formed in a chip card body, which is easier to produce and simpler to use.

Another object of the invention is to propose a chip card complying with the ISO 7816 standard, offering services via a standard reading programmable controller (with contact or without contact), and services via a USB connection for authentication, on-line payment, or document signing applications or other services, that is easy to use and to handle and easy to manufacture.

A technical problem to be considered is the usual thickness of the chip cards defined by the ISO 7816 standard, namely around 0.76 mm, and the standard dimensions of a USB female connector. In the context of the invention, they are type A USB female connectors.

Figure 1A:
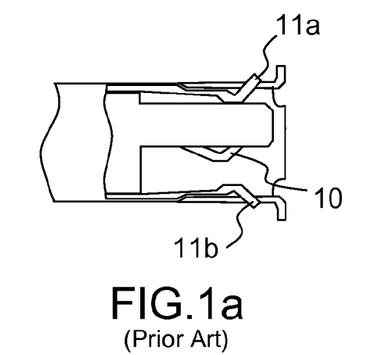
FIGS. 1a and 1b are views in section from the side and from the front of a type A USB female connector.
Figure 1B:
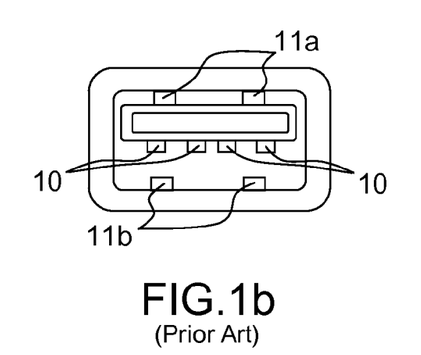

Such a connector is illustrated in section in the views of FIGS. 1a and 1b. They show the electric connection pads 10 and upper tightening elements 11a and lower tightening elements 11b which perform a function of tightening around the male connector when it is inserted into the female connector.

The height of the free space between the connection pads 10 and the lower tightening elements is of the order of 2 mm. The thickness of the male connector is usually slightly greater than this height, so that, in combination with the tightening elements 11a and 11b, a minimal force for extracting the male connector, namely 2.24 pounds (or 1.016 kg in the international unit system, required by the ISO 7816 standard).

SUMMARY OF THE INVENTION

The technical solution provided by the invention to these technical problems is to use a chip card body in which at least one hinge is made comprising at least one element made of flexible material such as elastomer or rubber, allowing a closed folding of the card body by which the shape of the male USB connector is separated, and such that the thickness of the folded object obtained is greater than 2 mm, preferably between 2.2 and 2.5 mm.

"Closed folding" means a folding by which the portions of the card are folded one onto the other until touching. The folded object is therefore a substantially flat object.

The thickness of the folded object allows it to be inserted into the female connector and tightened by the spring elements provided in this female connector, which makes it possible to respond to the minimum required extraction force.

The invention relates to a flexible portable electronic device comprising a contact sticker layout of a male USB connector placed on the surface and at the edge of a chip card body of standard thickness. The card body comprises at least one elastic hinge —sometimes referred to as a plastic hinge, filament hinge or filiform hinge—going from one edge to the other of the card body, parallel to the longitudinal edges of the said USB contact layout formed of an elastic deformable material, more elastic than the material of the said card body. The hinge is inserted into the thickness of the said card body, making it possible to switch the card body from an unfolded state, substantially flat, to a closed folded state, obtained by folding to substantially 180 degrees. The card body has a contour in the unfolded state such that, in the said closed folded state, the zone bearing the USB contact layout forms a substantially flat object with a thickness and a width, those of a male USB connector.

According to one aspect of the invention, the portable electronic device comprises two elastic hinges parallel the longitudinal edges of the USB contact layout going from one edge to another of the card body, each delimiting a central portion and a lateral portion of the card body, the said USB contact layout being placed on one of the said central or lateral portions, the closed folded state being obtained by folding to substantially 180 degrees each of the two lateral portions so as to leave the said USB contact layout exposed.

Advantageously, the card body is an ISO 7816 card body comprising a corresponding chip module in one of the central or lateral portions with an ISO 7816 contact layout on the surface, and in that the card body in the unfolded state has a thickness complying with this ISO 7816 standard, and a contour corresponding to a rectangle of dimensions corresponding to the ISO standard, but with a cutout such that, in the said folded state, the zone supporting the USB contact layout has the thickness and the width of a male USB connector.

In one embodiment, the hinges are placed parallel to the longitudinal edges of the card body. In this embodiment, the card body may comprise a magnetic strip on a lateral portion, running along a longitudinal edge of the card body. In addition, by placing these hinges so that the ISO 7816 contact layout is on a lateral portion, it is advantageously possible to incorporate an antenna into this lateral portion, allowing contactless connections.

According to one embodiment of the invention, the hinge or hinges are made of elastomer or of rubber.

BRIEF DESCRIPTION OF THE DRAWINGS

FIGS. 2b, 2d, 3b, 3c, and 6b are cross-sectional views.

DETAILED DESCRIPTION

FIGS. 2a to 2c, 3a to 3c and 4 illustrate a portable electronic device according to the invention with ISO 7816 and USB interfaces.

The device comprises a chip card body 1 conforming to the ISO 7816 standard, with a corresponding contact layout on the surface, marked v2 in the figures.

Such a card body is typically formed from a stack of layers, fabricated in a well known manner, by the laminating of thin plastic sheets. The outermost layers are usually transparent and serve as protective layers to the layers on which patterns have been printed, typically by screen printing. One or more chips, not shown, are placed in the card body.

Note that according to the ISO 7816 standard, a chip card body has a rectangular shape R with standard dimensions L1 of 85.6 millimeters for the long sides 4, 5 and W1 of 53.98 mm for the short sides 6, 7, with a thickness $e_c$=0.76 mm. In practice there is a tolerance of these dimensions, and the angles are not necessarily right angles. The thickness $e_c$ of the card body is very thin, which means that this card body is often considered to be a two-dimensional object (L1, W1). In the specialist technical vocabulary, this card format corresponds to the ID1 type. The contact layout v2 conforming to the ISO 7816 standard is placed in a precise, standard location on the card body depending on the electrical and mechanical specifications of the interface, as indicated in the ISO 7816 standard. This location is identified as an indication in FIG. 2a by two axes X and Y, in a zone Z1 reserved for connection to a card reader, corresponding to a portion of the card body from the edge 7, which is inserted into the reader, at least over the whole length of the contact layout v2. The contact pads of the contact layout v2 are connected to the contacts of one chip inserted into the card body. The chip is generally situated at the back of the contact layout and the connection is provided by threads or flip chip technology.

In the invention, the card body comprises, at the surface, a contact layout v1 of a male USB connector. The contact layout v1 typically comprises, in a known manner, four contact pads p1 to which the contacts of at least one chip inserted into the card body are connected. The two contact layouts v1 and v2 are preferably made on the same face of the card body, making fabrication easier.

The contact layouts v1 and v2 each have a substantially rectangular shape. Their longitudinal edges give the direction of insertion into a corresponding reader or connector. These directions are marked Du for v1, and Dc for v2.

The card body 1 comprises two parallel elastic hinges 2 and 3, each going from one edge to another of the card body, and distant from one another by a width corresponding to the width $w_u$ of a male USB connector, typically 12 mm. The hinges 2 and 3 are parallel with the longitudinal edges of the contact layout v1.

They partition the card body into three longitudinal portions, a central portion A and two lateral portions B and C. The central portion A is delimited by the hinges 2 and 3 over its whole length: its width is $w_u$. By convention in the figures, the hinge 2 is situated between the lateral portion B and the central portion, and the hinge 3 between the central portion A and the lateral portion C.

The hinges allow each of the lateral portions to be folded to substantially 180 degrees onto the card body. They are formed by means of an elastic material 4, typically an elastomer such as neoprene or a rubber inserted into the card body.

Depending on the arrangement of the hinges 2 and 3, various configurations can be obtained.

Figure 2A:
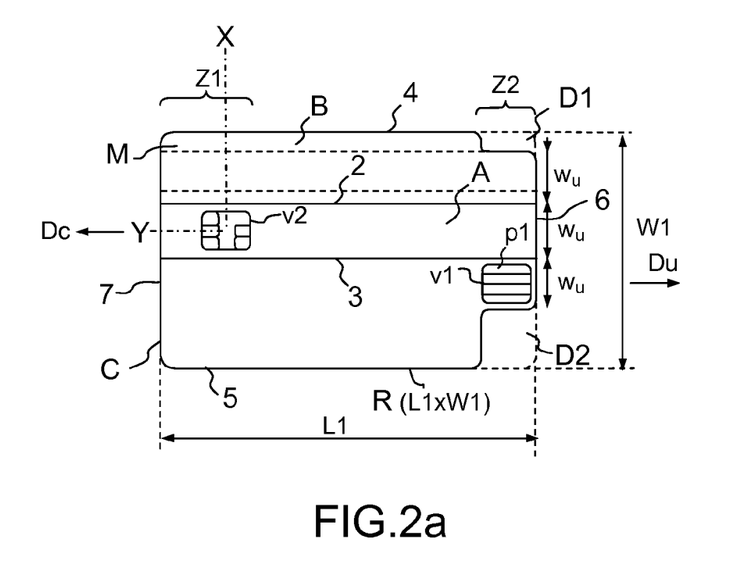
FIGS. 2a to 2d illustrate an embodiment of a portable electronic device of the type with ISO 7816 and USB interfaces.
Figure 2B:
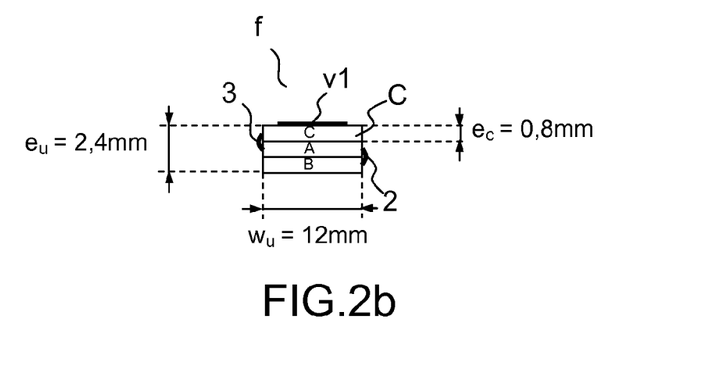
Figure 2C:
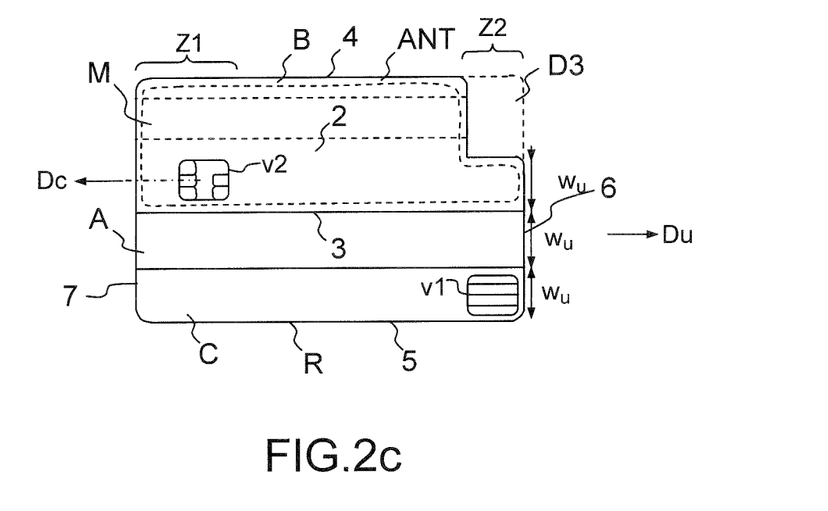
Figure 2D:
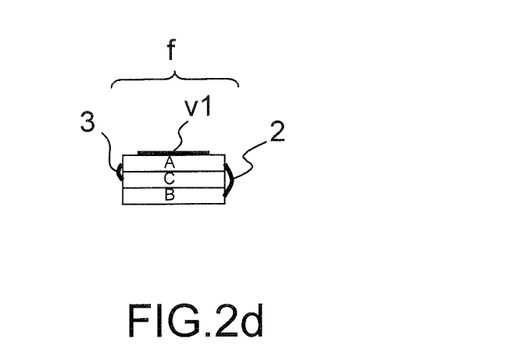

In the configurations illustrated in FIGS. 2a and 2c, the hinges 2 and 3 are parallel with the longitudinal edges of the card body. The lateral portion B is therefore delimited by a longitudinal edge 4 of the card body and the hinge 2, and the lateral portion C by the opposite longitudinal edge 5, and the hinge 3.

Such an arrangement of the hinges 2 and 3, parallel with the longitudinal edges of the card body, makes it possible to provide a magnetic strip M, on the back of the card body (relative to the reverse side bearing the contact layouts), as illustrated in dotted line in FIG. 2a. Such strips are routinely provided in bank transaction cards.

The contact layouts v1 and v2 are placed on the two opposite edges 6 and 7 of the card body, corresponding to the short sides of the rectangle R, so that their respective directions of insertion Du and Dc are parallel and in opposite directions.

In the embodiment of FIG. 2a, the hinges 2 and 3 are placed on either side of the contact layout v2. The contact layout v2 is therefore placed on the central portion A. Because of the standard dimensions of the card body and more particularly because of its width, around 54 mm, and the standard position of the contact layout v2, the two lateral portions B and C are then necessarily wider than the central portion A. The contact layout v1 must be placed on one of the two lateral portions B or C. In the example, it is positioned on C.

The contour of the card body, which normally corresponds to the rectangle R, is rectified so that the width of each of the two lateral portions B and C in the USB connection zone Z2 is reduced to the width $w_u$. This adaptation of the width of the portions B and C in the zone Z2 makes it possible in combination with the hinges 2 and 3, to separate the shape of the male USB connector by folding. More precisely, as illustrated in FIG. 2a, the width of the portions C and B is reduced over the depth of the zone Z2 from the edge 6 of the card body. This amounts to removing the portions referenced D1 and D2 in FIG. 2a from the standard rectangular shape R. Therefore, at least along the contact layout v1 and up to the edge 6 corresponding to the side of the male connector which must be inserted into a female USB connector, the lateral portions B and C and central portion A are substantially of equal width $w_u$. The closed folded state is obtained in the example by folding the lateral portion B onto the central portion A, and the lateral portion C onto the central portion A. In the closed folded state (FIG. 2b), in the zone Z2 bearing the contact layout v1, a flat object f is obtained corresponding to a male USB connector, with a thickness $e_u$, of the order of 2.4 mm (0.8×3), and with a width $w_u$ of the order of 12.

The hinges 2 and 3 therefore make it possible to form the electronic device 1 in two states: an unfolded state, open, in which the device is substantially flat and of substantially uniform thickness corresponding to the thickness of an ISO 7816 chip card; a closed folded state in which the shape f of a male USB connector is obtained in the zone Z2.

It is possible to obtain other configurations, depending on the position of the hinges 2, 3. The position of the hinges acts notably on the shapes of the cuts to be provided and on the portion that can be chosen to support the contact layout v1. All the chosen configurations are such that, in the closed folded state, the three portions under the contact layout v1 form a male USB connector.

One particular configuration is illustrated in FIG. 2c, which carefully exploits the width W1 of the ISO 7816 card body. In this configuration, the two slender elastic hinges 2, 3 delimiting the three portions A, B and C are placed parallel with the longitudinal edges 4 and 5 of the card body and such that one of the lateral portions, C in the example, and the central portion A each have a width corresponding to the width ($w_u$) of a male USB connector over their whole length. The other lateral portion B then has a width greater than half of the width of the card body. As illustrated, the hinge 3 is therefore positioned at a distance $w_u$, typically 12 mm, from the card edge 5, and the other hinge 2 at a distance $2[[x]]w_u$, namely typically approximately 24 mm, from this card edge 5. Because of the standard dimensions of the card body, the hinge 2 is therefore at a distance of the order of 30 mm from the opposite card edge 4 and the contact layout v2 is supported by the lateral portion B.

The USB contact layout (v1) can then be placed on any one of the portions A, B or C. Depending on the portion on which the contact layout v1 is placed, the folding may be different from that of FIG. 2b. If the contact layout v1 is placed on the lateral portion C as illustrated in FIG. 2c, the folding is as illustrated in FIG. 2b, like an accordion: the portion C is folded under the portion A and the portion B over the portion A. In the folded state, this gives the stacked portions in the order C/A/B with the contact layout v1 on the portion C.

If the contact layout v1 were positioned on the central portion A, the portion C is first folded under the portion A, then the portion B under the portion C. In the folded state (FIG. 2d) this gives the stacked portions in the order A/C/B, with the contact layout on the portion A. The hinge 2 between the portions A and B must be able to stretch sufficiently to allow this folding under the stack A/C.

The configuration that has just been described taking as an example FIG. 2c advantageously makes it possible to incorporate an antenna ANT into the portion B of the card body according to any technique known to those skilled in the art. The shape factor of such an antenna makes it possible to satisfy the requirements of the various known contactless technologies. It is therefore possible to produce a portable electronic device making it possible also to achieve contactless connections.

In the embodiment of FIGS. 2a and 2c, the hinges 2 and 3 are parallel with the insertion directions Du and Dc of the two contact layouts. They may reduce the stiffness of the chip card, which could pose some problems in practice for inserting the card into an ISO 7816 card reader.

In an enhancement of the invention, the contact layout v1 and the hinges 2 and 3 are placed on the card body outside the connection zone Z1 of the contact layout v2. This has the advantage of ensuring that this portion Z1 of the card body which is inserted first into the reader remains properly flat and rigid making insertion easier. This is obtained by placing the contact layouts v1 and v2 so that their insertion directions Du and Dc form a non-zero angle α.

Figure 3A:
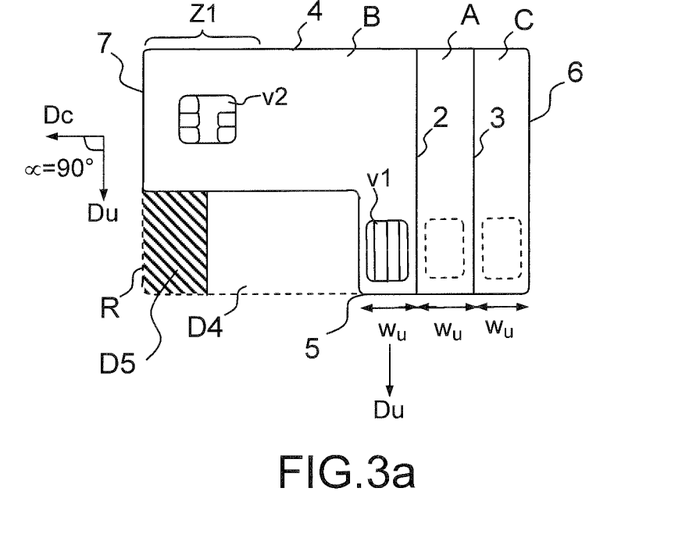
FIGS. 3a to 3c illustrate another embodiment of such a device.

FIG. 3a illustrates a first corresponding embodiment. The contact layout v1 is placed on the edge of one of the longer sides of the card body, in the example the side 5, so that its insertion direction Du is perpendicular to this side 5. The insertion directions Du and Dc are therefore perpendicular, forming an angle α of 90°. The elastic hinges 2 and 3 are parallel with the longitudinal edges of the contact layout v1 corresponding to the insertion direction Du into a USB connector, that is to say parallel with the edges 6 and 7 of the card body.

The position of the hinges 2 and 3 and the contour of the card body are determined so that, in the connection zone Z2, that is to say along the contact layout v1 and up to the edge 5, the lateral and central portions are substantially of equal width $w_u$. Preferably and as shown, the hinge 3 is placed at a distance from the edge 6 equal to the width $w_u$. The two portions A and C therefore have the width $w_u$ over the whole of their length. The contour of the card body is rectified by removing from the standard rectangular shape R a sufficient portion D4 making it possible, in the closed state, to separate the shape f of the male connector from the rest of the card body. It is possible to leave a portion D5, cross-hatched in the figure, corresponding to the angle between the sides 5 and 7 of the rectangle R. This portion D5 makes it possible to ensure a correct guidance into an ISO 7816 card reader. If this portion D5 is also removed, the card will preferably be used with a reader in the vertical position, making it possible to wedge the card in the reader by means of the longitudinal edge 4.

In the closed folded state, the zone f supporting the contact layout v1, corresponding to the stacking of the three portions of thickness $e_c$, has the thickness $e_u$ and the width $w_u$ that are desired (FIG. 3b), forming the male USB connector ready for use.

Figure 3B:
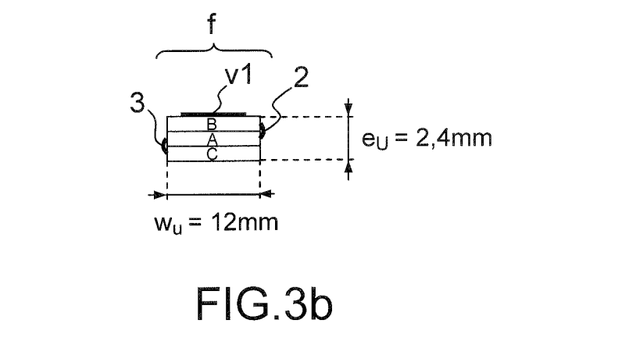
Figure 3C:
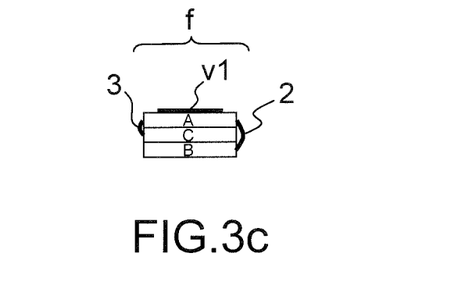

In this example, the lateral portion B supports the two contact layouts v1 and v2. The contact layout v1 could also be on the other lateral portion C. In both cases, the folding is of the B/A/C accordion type as illustrated in FIG. 3b.

In the illustrated example, the central portion A and the lateral portion B having the same width $w_u$, the contact layout v1 may also be placed on the central portion A. The folding, in order to leave the contact layout v1 exposed, then consists (FIG. 3c) in folding the lateral portion C under the central portion A, then in folding the lateral portion B under the lateral portion C. This folding A/C/B assumes that at least the hinge 3 between the portions A and C is flexible enough to allow this folding over a thicker portion.

Figure 4:
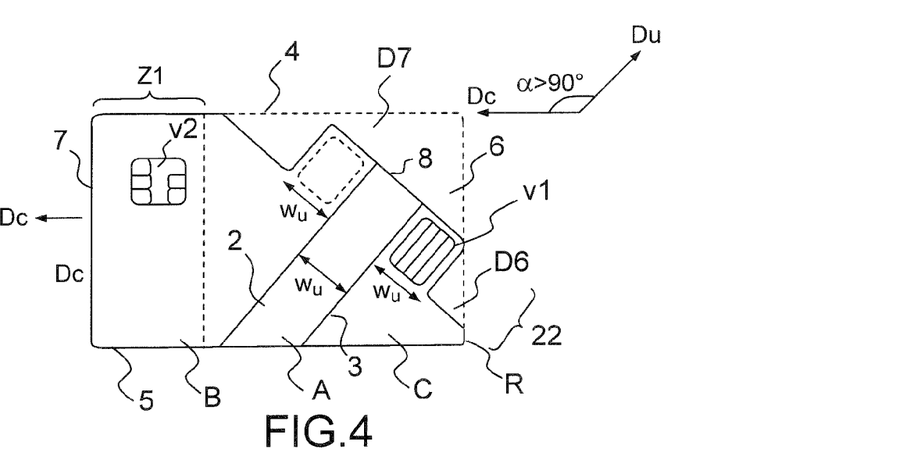
FIG. 4 illustrates another embodiment of such a device.

FIG. 4 illustrates a variant of the preceding embodiment, in which the insertion directions Du and Dc form an angle α greater than 90 degrees. The angle α is defined so that the elastic hinges 2 and 3, going from one edge to the other of the card, parallel with the longitudinal edges of the contact layout v1, do not enter the connection zone Z1 of the contact layout v2. The insertion edge 8 of the contact layout v1 is then in a zone of cutting of the contour, set back from the rectangle R.

The contour of the card body is always included in a rectangle R. But there is one shape which corresponds, in the illustrated example, to a cutting of portions D6 and D7, making it possible to obtain lateral and central portions which have, at least in the connection zone Z2, that is to say at least over the whole length of the contact layout v1 and up to the insertion edge 8, a width that is substantially equal to the desired width $w_u$. Folding is in this instance necessarily of the accordion type, and the contact layout v1 placed on one of the lateral portions B or C, not on the central portion, because the shapes of the lateral portions B and C outside the zone Z2 are not suitable for a folding of one over the other. In the example, the contact layout v1 is placed on the portion C.

In the three embodiments that have just been described, because of the shapes of the portions A, B and C delimited by the hinges 2 and 3, the device in the closed folded state does not have a uniform configuration. What counts is that in this folded state the object f separated from the card body has the width and the thickness of a male USB connector.

The invention that has just been described makes it possible to produce a flexible electronic device with an ISO 7816 interface and USB interface, which, in the folded state, forms a USB male connector to the standard dimensions. According to the variants, the folding may be different, an antenna and/or a magnetic strip may also be provided. The invention is not limited to the configurations presented in the figures.

For example, the contact layout v1 may be on the face opposite to the face supporting the contact layout v2.

This portable electronic device with a dual function, USB and ISO 7816 chip card according to the invention is obtained according to the fabrication techniques for chip cards. The particular contour for making it possible to obtain the width of the USB connector is obtained by simple adaptation of the cutting pattern in the plates of cards fabricated continuously.

Figure 5:
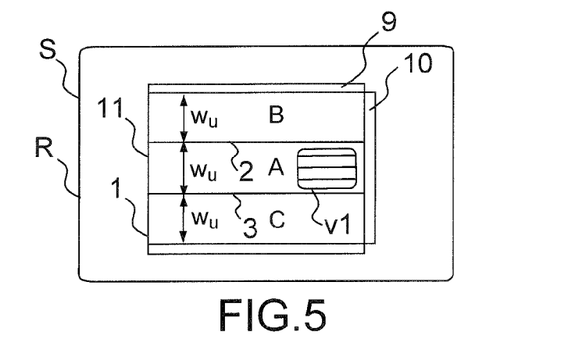
FIG. 5 illustrates an embodiment of a portable device of the USB key type according to the invention.

The invention may also apply to a flexible portable electronic device with a single function of USB key. It then simply involves obtaining a USB key by folding, according to the principles explained above. There are no longer any considerations of standard dimensions of a chip card body or of an imposed contact layout position. It is then possible to produce the hinges so as to partition the card body into portions of the same width, corresponding to the width $w_u$, over their whole length, as illustrated in FIG. 5. In the closed folded state, the device is then a substantially flat object and has an equal thickness over the whole of its surface, corresponding to the thickness of a male USB connector. The folding must be adapted depending on whether the contact layout v1 is on one of the lateral portions or on the central portion: folding of the accordion type B/A/C for the first; or an A/B/C or A/C/B folding in the second. In this case, the hinge of the lateral portion folded last must be able to withstand a greater stretch than the other hinge, without tearing.

In one variant, the card body 1 is shown to be detachable from a card body S in the format of a chip card, which notably, in a known manner, makes it possible to benefit from a larger graphic customization surface. Cuts 9, 10 or zones of thinning 11 of the thickness of the card body S illustrated in FIG. 5, will then be provided, delimiting the contour of the card body 1 and allowing its detachment by simple pressure of the fingers.

The invention that has just been described is particularly suitable for producing a portable electronic device with a USB connector based on the technologies of fabricating chip cards, with a thickness of the card body corresponding to the standard thickness, of the order of 0.8 mm, of cards in ISO 7816 format.

Figure 6A:
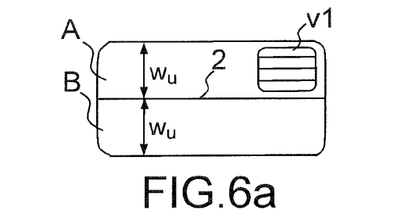
FIGS. 6a and 6b illustrate a variant of this embodiment.
Figure 6B:
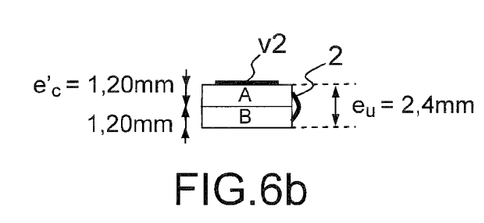

It is known how to produce thicker card bodies, while remaining within acceptable thickness limits via corresponding fabrication tools. Notably, it is known how to produce card bodies of thickness $e'_c$ of approximately 1.2 mm. It is then possible to produce a flexible portable device of the USB key type, with a single hinge 2, partitioning the card body into two portions A and B, one of which supports the contact layout v1. The USB connector is formed by folding one portion over the other. This is what is illustrated in FIGS. 6a and 6b.

The invention that has just been described makes it possible to produce a portable electronic device with a USB connector, based on technologies for fabricating chip card bodies, by using at least one hinge made in the card body, allowing a 180° folding of one portion of the card body over another.

Such a hinge may, in practice be produced by adapting the card body fabrication procedure in different ways. According to the teaching found in U.S. Pat. No. 7,070,095 B1, provision is made in the fabrication of the card body, as illustrated in FIGS. 30, 31 and 33 of the referenced patent, and adopting the reference numbers of these figures, for producing a first stack (740) and a second stack (742), a line of weakness, typically produced by removing material to a certain depth on at least one of the stacks, which corresponds to reference numbers (702 or 725 in FIG. 30). The two stacks are assembled by placing an intermediate layer between the two, comprising an elastic deformable material (722), typically an elastomer such as neoprene, which thereby forms a bridge in the location of the line of weakness, and, on either side, a rigid plastic material, typically PVC. In this teaching, the elastic material and the rigid material on either side are coplanar but spaced apart. The line of weakness and the elastic material form a hinge making it possible to fold to 180° one portion of the card body over another. In this way, it is possible to create the hinge or hinges of a portable electronic device according to the invention.

Figure 7:
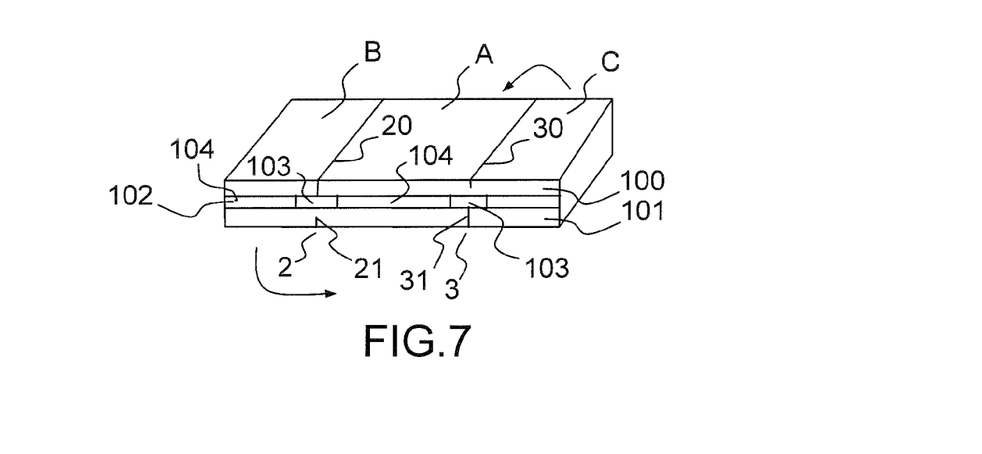
FIG. 7 is a partial view in section of a card body according to the invention detailing a hinge used in a portable electronic device according to the invention.

In a variant illustrated in FIG. 7, which illustrates a partial view in section of the card body detailing an embodiment of the hinges 2 and 3, a deformable material is inserted at an internal layer of the card body, forming the hinges 2, 3. Cuts are made on the front and on the back of the card body, vertically in line with the deformable material. More precisely, as illustrated, the stack of the card body comprises a top portion 100 and a bottom portion 101, and a middle layer 102. The middle layer comprises a deformable material 103 forming each of the hinges 2, 3 and, on either side, a rigid plastic material (104), typically PVC. In the example, the elastic material 104 and rigid plastic material 105 are not spaced apart, but are joined together, forming a continuous flat strip. This may be obtained by using a co-extrusion procedure of materials that is suitable for putting out such a strip. Typically the materials 104 and 105 are inserted in the form of granules in hoppers of an extrusion machine suitable for putting out the desired continuous flat strip. A calendering procedure then makes it possible to control the thickness. For each hinge, two cuts are made, one on the front, one on the back of the card body, each starting from the surface of the card until reaching a certain depth, at the maximum until reaching the deformable material. This creates a line of weakness above and below the elastic material forming the hinge. Control of the depth of each cut makes it possible to promote a folding in one direction, or to allow folding in both directions. It also makes it possible to not allow the deformable material to appear visually. In the example, for the hinge 2, a cut 20 is made in the top portion 100, along the hinge 2, over the whole thickness of this portion, revealing the elastic material 104 forming the hinge 2. A cut 21 is made in the bottom portion 101, along the hinge 2 over a portion with only the thickness of this portion. These cuts 20 and 21 promote folding of the portion B of the card body onto the top surface of the card body. Conversely, for the hinge 3, a cut 30 is made in the top portion 100, along the hinge 2, over a portion only of the thickness of this portion. A cut 31 is made in the bottom portion 101, along the hinge 2, over the whole thickness of this portion, revealing the elastic material 104 forming the hinge 3. These cuts 30 and 31 promote the folding of the portion C of the card body onto the bottom surface of the card body. The example illustrated therefore allows folding of the portions A, B, C of the card body like an accordion, as illustrated in FIG. 2b or 3b. If the partial cuts are made on the same side, this promotes the other folding. In addition, the partial cuts 21 and 30 ensure a certain rigidity of the card body in the unfolded state.

The invention that has been described makes it possible to offer a flexible portable electronic device of the USB key type, and preferably with dual functionality USB and ISO 7816, by a very simple and agreeable manipulation which does not require particular attention. It may be produced at low cost using all of the chip card fabrication equipment, whether it be the laminating, the machining, the cutting or the graphic customization.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:
1. A flexible, portable electronic device comprising:
   a. a chip card body conforming to the ISO 7816 standard comprising:
      i. a length;
      ii. a width;
      iii. a substantially planar front surface;
      iv. a substantially planar back surface;
      v. an edge located around the perimeter of the front and back surfaces;
      vi. an ISO 7816 contact layout; and
      vii. in an unfolded state, thickness conforming to the ISO 7816 standard;

b. two elastic hinges substantially straight and substantially parallel to each other and substantially parallel to longitudinal edges of the chip card body; wherein
  i. each elastic hinge extends to two distinct points along the edge;
  ii. the elastic hinges are at a distance from one another corresponding to the width of a male USB connector over their whole length;
  iii. the two elastic hinges delimit a central portion and two lateral portions in the chip card body, wherein the ISO 7816 contact layout is located on one of the lateral portions, and the lateral portion on which the ISO 7816 contact layout is located has a width which is greater than half the width of the chip card body;
  iv. each elastic hinge is formed in such a way as to be able to fold the chip card body 180 degrees along the hinge; and
  v. when both elastic hinges are folded, the chip card body exists in a closed folded state;
c. a male USB contact layout located on one of the central portion or the other lateral portion from the lateral portion on which the ISO 7816 contact layout is located in such a way that when the chip card body is in the closed folded state:
  i. the male USB contact layout is exposed;
d. a cutout formed in such a way that when the chip card body is in the closed folded state:
  i. the chip card body forms a substantially flat object with a thickness and a width substantially equal to the dimensions of a male USB connector; and
  ii. the chip card body may be used as a USB device using the male USB contact layout.

2. The device according to claim 1, wherein the lateral portion of the chip card body on which the ISO 7816 contact layout is located incorporates an antenna.

3. The device according to claim 1, wherein one of the lateral portions comprises a magnetic strip.

4. A flexible, portable electronic device comprising:
a. a chip card body conforming to the ISO 7816 standard comprising:
  i. a length;
  ii. a width;
  iii. a substantially planar front surface;
  iv. a substantially planar back surface;
  v. an edge located around the perimeter of the front and back surfaces;
  vi. an ISO 7816 contact layout having an insertion direction; and
  vii. in an unfolded state, thickness conforming to the ISO 7816 standard;
b. two elastic hinges substantially straight and substantially parallel to each other; wherein
  i. each elastic hinge extends to two distinct points along the edge;
  ii. the elastic hinges are at a distance from one another corresponding to the width of a male USB connector;
  iii. the two elastic hinges delimit a central portion and two lateral portions in the chip card body, wherein the ISO 7816 contact layout is located on the central portion;
  iv. each elastic hinge is formed in such a way as to be able to fold the chip card body 180 degrees along the hinge; and
  v. when both elastic hinges are folded, the chip card body exists in a closed folded state;
c. a male USB contact layout, having an insertion direction, located on one of the central or lateral portions in such a way that when the chip card body is in the closed folded state:
  i. the male USB contact layout is exposed;
  ii. the chip card body forms a substantially flat object with a thickness and a width substantially equal to the dimensions of a male USB connector; and
  iii. the chip card body may be used as a USB device using the male USB contact layout;
  wherein the USB male contact layout and the ISO 7816 contact layout are located on the chip card body in such a way that their respective insertion directions, each parallel to longitudinal edges of the associated contact layout, form a non-zero angle, and that the elastic hinges do not intersect a zone reserved for the ISO 7816 connection, the zone starting from an insertion edge and covering at least a depth of the ISO 7816 connection contact layout.

5. The device according to claim 4, in which the angle is greater than or equal to 90 degrees.

6. The device according to claim 1, wherein the USB male contact layout is located on one of the lateral portions and the folding is an accordion-like folding, in which each lateral portion has an inner face folded onto a respective face of the central portion.

7. The device according to claim 1, wherein the lateral portions comprise a first lateral portion and a second lateral portion, and wherein male USB contact layout is located on the central portion, the closed folded state being obtained by folding the first lateral portion onto the central portion, then folding the second lateral portion on top of the first lateral portion.

8. The device according to claim 1, in which the elastic hinges comprise elastomer or rubber.

9. The device according to claim 4, in which the elastic hinges comprise elastomer or rubber.

10. The device according to claim 1, wherein the chip card body is formed in a card body in ISO 7816 format, from which it can be detached.

11. The device according to claim 1, wherein the USB male contact layout and the ISO 7816 contact layout are both located the same surface of the chip card body.

12. The device according to claim 4, wherein the USB male contact layout is located on one of the lateral portions and the folding is an accordion-like folding, in which each lateral portion has an inner face folded onto a respective face of the central portion.

13. The device according to claim 4, wherein the lateral portion comprise a first lateral portion and a second lateral portion, and wherein male USB contact layout is located on the central portion, the closed folded state being obtained by folding the first lateral portion onto the central portion, then folding the second lateral portion on top of the first lateral portion.

* * * * *

UNITED STATES PATENT AND TRADEMARK OFFICE
CERTIFICATE OF CORRECTION

| | | |
|---|---|---|
| PATENT NO. | : 8,488,327 B2 | Page 1 of 1 |
| APPLICATION NO. | : 12/553000 | |
| DATED | : July 16, 2013 | |
| INVENTOR(S) | : Laurent Garnier | |

It is certified that error appears in the above-identified patent and that said Letters Patent is hereby corrected as shown below:

In the Specification:

Column 3, line 58, delete the word "sticker".
Column 6, line 51, delete the word "slender".

Signed and Sealed this
Seventeenth Day of September, 2013

Teresa Stanek Rea
*Deputy Director of the United States Patent and Trademark Office*